(No Model.)
A. C. HENDRICKS.
FERTILIZER DISTRIBUTER AND GRAIN DRILL.
No. 272,546. Patented Feb. 20, 1883.
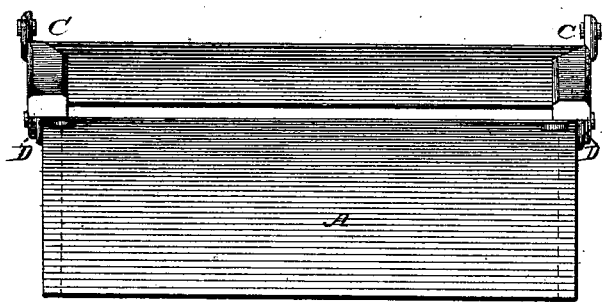
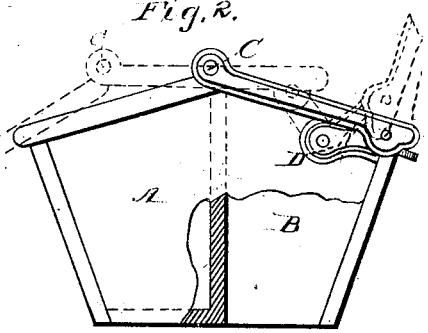
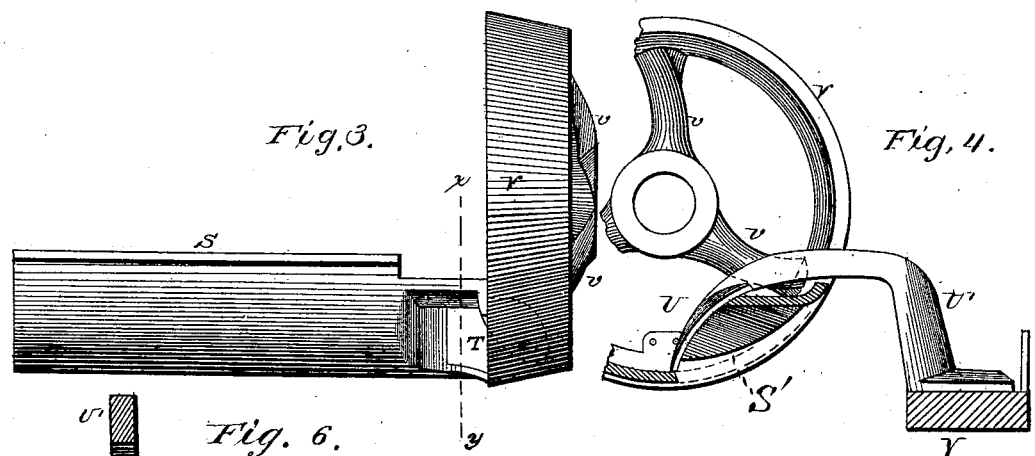
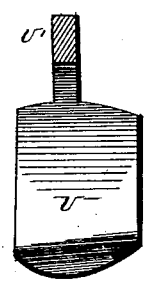
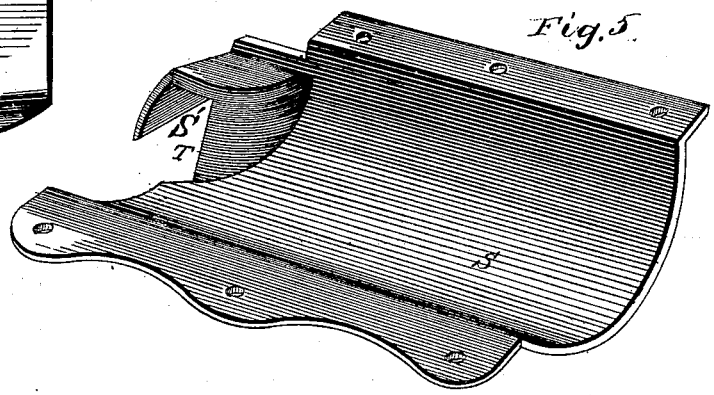
WITNESSES:
Fred. G. Dieterich.
Jno. W. Stockett.
INVENTOR.
Adam C. Hendricks,
By Daniel Breed ATTORNEY.

UNITED STATES PATENT OFFICE.

ADAM C. HENDRICKS, OF DUFFIELD'S, ASSIGNOR OF ONE-HALF TO HENRY ST. JOHN SHEPHERD, OF SHEPHERDSTOWN, WEST VIRGINIA.

FERTILIZER-DISTRIBUTER AND GRAIN-DRILL.

SPECIFICATION forming part of Letters Patent No. 272,546, dated February 20, 1883.

Application filed September 22, 1882. (No model.)

*To all whom it may concern:*

Be it known that I, ADAM C. HENDRICKS, of Duffield's, in the county of Jefferson and State of West Virginia, have invented certain new and useful Improvements in Fertilizing Grain-Drills; and I do hereby declare that the following is a full, clear, and exact description of the invention, which will enable others skilled in the art to which it appertains to make and use the same, reference being had to the accompanying drawings, which form a part of this specification.

My invention consists of certain improvements relating to the hopper of a combined grain-drill and fertilizing-machine, which will be understood by the following description.

In the accompanying drawings, Figures 1 and 2 represent my improved hinges for the covers of the hopper of a fertilizer and grain-drill. Figs. 3, 4, 5, and 6 represent detached views of improved devices for the agitation and discharge of the fertilizer.

The general construction of my machine may be of the usual form, which need not be described, as I confine my claims to the following features:

First. The hopper of the machine is made with two compartments, namely, the wheel-box A and the fertilizer-box B, Fig. 2. The two lids of the hopper are pivoted together at C, and both are loosely hinged to the hopper by means of link D, which allows the lids to be either pushed back or elevated, and then swung forward and placed in a self-supporting position, with both of the hoppers open, as shown in dotted lines, Fig. 2. By this construction the lids or covers may be folded and placed forward out of the way, and at the same time putting the covers in a position that will prevent spilling the grain and fertilizer in filling the two parts of the hopper, which is a great advantage.

Second. Attached to the bottom of the hopper or box B, Fig. 2, is a series of metallic plates, S, Fig. 5, having feed-openings T and a scraper, S', which, as the wheel revolves, scrapes the fertilizer off from the inside of the rim of the wheel, and then the fertilizer falls into the grain-tube below. The feed-opening T is provided with a slide or gate, U, having a lever or arm, U', attached to and operated by a lever, Y.

Third. Working above the feed-opening inside of the hopper is a series of rimmed wheels, V, having radial arms $v$, with sharp edges, to work the fertilizer toward the feed-opening T, above mentioned, and thus facilitate the discharge and prevent bridging of the same.

Having described my invention, what I claim is—

1. In a fertilizing and grain drill, the two lids of the hopper pivoted together at C, and hinged to the hopper by means of the swinging link D, substantially as and for the purposes set forth.

2. The series of rimmed wheels V, having the radial arms or scrapers $v$ for the purpose of agitating the fertilizer and feeding down the same to the feed or discharge openings, substantially as and for the purposes set forth.

3. The series of plates S, having openings T in the bottom of the hopper, in combination with the slide U, having an arm, U', attached to lever Y, and operated thereby in the usual manner, substantially as and for the purposes set forth.

In testimony that I claim the foregoing as my own I have hereto affixed my signature in presence of two witnesses.

ADAM C. HENDRICKS.

Witnesses:
DANIEL BREED,
DANL. H. MATHEWS.